US007591573B2

(12) United States Patent
Maliar et al.

(10) Patent No.: US 7,591,573 B2
(45) Date of Patent: Sep. 22, 2009

(54) HEADLIGHT LAMP HOLDER EQUIPPED WITH CLAWS ORIENTED TANGENTIALLY WITH RESPECT TO THE WALL OF THE LAMP HOLDER

(75) Inventors: Rémi Maliar, Saint Saulve (FR); Cyril Herbin, Potelle (FR)

(73) Assignee: Valeo Vision, Bobigny (FR)

( * ) Notice: Subject to any disclaimer, the term of this patent is extended or adjusted under 35 U.S.C. 154(b) by 84 days.

(21) Appl. No.: 11/612,673

(22) Filed: Dec. 19, 2006

(65) Prior Publication Data

US 2007/0139945 A1 Jun. 21, 2007

(30) Foreign Application Priority Data

Dec. 20, 2005 (FR) .................................. 05 12982

(51) Int. Cl.
*B60Q 1/00* (2006.01)

(52) U.S. Cl. ....................... 362/548; 362/516; 362/519; 362/538; 362/546

(58) Field of Classification Search ................. 362/263, 362/265, 267, 344, 516, 519, 538, 546, 548
See application file for complete search history.

(56) References Cited

U.S. PATENT DOCUMENTS

| | | | |
|---|---|---|---|
| 5,895,113 | A | 4/1999 | Ozaki et al. |
| 6,390,657 | B1 | 5/2002 | Billot |
| 6,474,856 | B2 | 11/2002 | Billot |
| 2001/0030877 | A1 | 10/2001 | Billot |
| 2005/0111230 | A1 | 5/2005 | Tronquet et al. |

FOREIGN PATENT DOCUMENTS

| | | |
|---|---|---|
| DE | 3432445 | 3/1986 |
| FR | 2435664 | 4/1980 |
| GB | 2029953 | 3/1980 |

*Primary Examiner*—Sandra L O'Shea
*Assistant Examiner*—Meghan K Dunwiddie
(74) *Attorney, Agent, or Firm*—Jacox, Meckstroth & Jenkins

(57) ABSTRACT

The invention concerns a lamp holder for a headlight that is intended to carry a lamp. The lamp holder having a roughly cylindrical tubular wall and has at least one claw that is electrically connected to the wall of the lamp holder and that is intended to be in contact with the body of the high-voltage connector, wherein the claw extends in a tangential direction with respect to the wall of the lamp holder and perpendicular with respect to the longitudinal principal axis.

16 Claims, 4 Drawing Sheets

HEADLIGHT LAMP HOLDER EQUIPPED WITH CLAWS ORIENTED TANGENTIALLY WITH RESPECT TO THE WALL OF THE LAMP HOLDER

BACKGROUND OF THE INVENTION

1. Field of the Invention

The invention concerns a headlight lamp holder, in particular for a motor vehicle, which is intended to carry a lamp, the cap of which is connected to a high-voltage connector.

2. Description of the Related Art

In headlights using a high-voltage lamp, the lamp emits an electromagnetic field that charges the reflector of the headlight with static electricity, increasing its electrical potential. In order to prevent the electrical potential increasing too much and causing sparks, the reflector must be electrically connected to the vehicle earth.

For this purpose, the lamp holder is produced from an electrically conductive material. The lamp holder is then electrically connected to the body of the high-voltage connector of the lamp, which is itself electrically connected to the vehicle earth. To electrically connect the lamp holder to the body of the connector of the lamp, equipping the lamp holder with contact claws is known.

Lamp holders of this type are already known. The lamp holder is generally equipped with claws that extend longitudinally towards the rear, projecting with respect to the rear end edge of the lamp holder. The claws thus extend in a ring over at least three quarters of the circumference of the rear end edge.

For their fixing to the lamp holder, the claws are generally produced in one piece with a clamping collar that is clamped around the external cylindrical wall of the lamp holder. This operation of clamping the claws on the lamp holder constitutes an additional operation in the assembly process, time-consuming, expensive, and liable to give rise to rejects.

However, such a design makes it difficult to mount the lamp on the lamp holder. This is because, in this arrangement, the claws partially block the rear orifice of the lamp holder in which the lamp must be inserted. It is in particular necessary to separate the claws in order to separate the lamp, and then actuate the means of fixing the lamp in the lamp holder. This operation requires in particular for the operator to be able to have access visually to the lamp holder in order to guide his actions.

In addition, in this arrangement, the size of the claws towards the rear is liable to pose problems for arranging the lamp holder in the engine.

In addition, the bayonet fixing of the connector on the lamp, and in particular the pivoting movement about the principal axis of the lamp holder, requires a relatively high force because the claws rub on the external wall of the body of the connector without being able to move away automatically.

What is needed therefore, is a lamp holder that overcomes one or more of the aforementioned problems.

SUMMARY OF THE INVENTION

The invention therefore proposes to resolve these problems by proposing a lamp holder of the type described above, wherein the claw extends in a tangential direction with respect of the lamp holder and perpendicular with respect to the longitudinal principal axis.

The invention concerns more particularly a lamp holder for a headlight, in particular for a motor vehicle, which is intended to carry a lamp whose cap comprises means for the bayonet mounting of a high-voltage connector, the lamp holder comprising:

- a body delimited radially by a roughly cylindrical tubular wall with a longitudinal principal axis, produced from an electrically conductive material;
- means of fixing the cap of the lamp coaxially in the lamp holder so that the body of the high-voltage connector, when it is mounted on the lamp, extends longitudinally towards the rear from a rear end edge of the wall of the lamp holder;
- at least once claw electrically connected to the wall of the lamp holder and intended to be in contact with the body of the high-voltage connector, when it is mounted, so as to discharge the lamp holder, which is electrically charged by an electromagnetic field emitted by the lamp.

According to other characteristics of the invention:

- the claw is carried by a rear end portion of a longitudinal finger that is fixed to an external face of the wall of the lamp holder and extends projecting with respect to the rear end edge of the wall of the lamp holder;
- the claw extends from the finger in a tangential direction with respect to the wall of the lamp holder in the direction of the pivoting movement for the bayonet mounting of the high-voltage connector;
- the lamp holder has a plurality of claws that are carried by at least one finger;
- the claws are arranged on the rear end portion of the finger, longitudinally one behind the other and parallel to each other so as to form a comb;
- the claws are elastically deformable in flexion in a radial direction with respect to the principal axis of the lamp holder;
- the finger is fixed to the wall of the lamp holder by means of a fixing flange;
- the finger is fixed to the wall of the lamp holder by a elastic snapping of the front end portion of the finger in a housing of complementary shape;
- the housing is formed by at least one carrier arranged on the external cylindrical face of the lamp holder so that the front end portion of the finger is mounted in a longitudinal sliding movement from rear to front between the external cylindrical face of the lamp holder and the carrier;
- the front end portion of the finger comprises a lug that extends radially so as to be received by elastic deformation in an associated aperture carried by the wall of the lamp holder in order to lock the sliding of the finger towards the rear;
- the aperture is carried by the carrier;
- the front end portion of the finger has a radial shoulder face intended to be in contact with an opposite face of the carrier in order to lock the sliding of the finger towards the front;
- the lamp holder is of the type in which the lamp is intended to be introduced from rear to front coaxially with the wall of the lamp holder until the cap is in abutment against a radial shoulder face of the lamp holder, and of the type in which the means of fixing the lamp cap comprise two parallel arms that extend in a radial plane inside the lamp holder and that are mounted so as to pivot about a common transverse axis arranged substantially tangentially to the wall of the lamp holder, between a front position and a rear position, the arms being mounted so as to be articulated with respect to the pivot axis between a first closed position in which the three ends of the arms are close to each other and a second open position in which the free ends of the arms are separated from each other, towards which they are elastically returned so that, in a closed front locking position, the arms lock the cap of the lamp against the shoulder face of the lamp holder, and so that, in a rear open release position, the cap is able to slide longitudinally towards the rear, the rotation of the arms about the pivot axis towards the rear being limited by a stop, wherein the stop is produced in one piece with the wall of the lamp holder;

the stop is produced by the rear lip of an opening produced in the cylindrical wall of the lamp holder;

the opening is produced in the vicinity of the free end of the arms;

the common pivot axis is produced in one piece with the arms.

Other characteristics and advantages will emerge during a reading of the following detailed description, for an understanding of which reference will be made to the accompanying drawings, amongst which:

DESCRIPTION OF THE PREFERRED EMBODIMENTS

Figure 1:
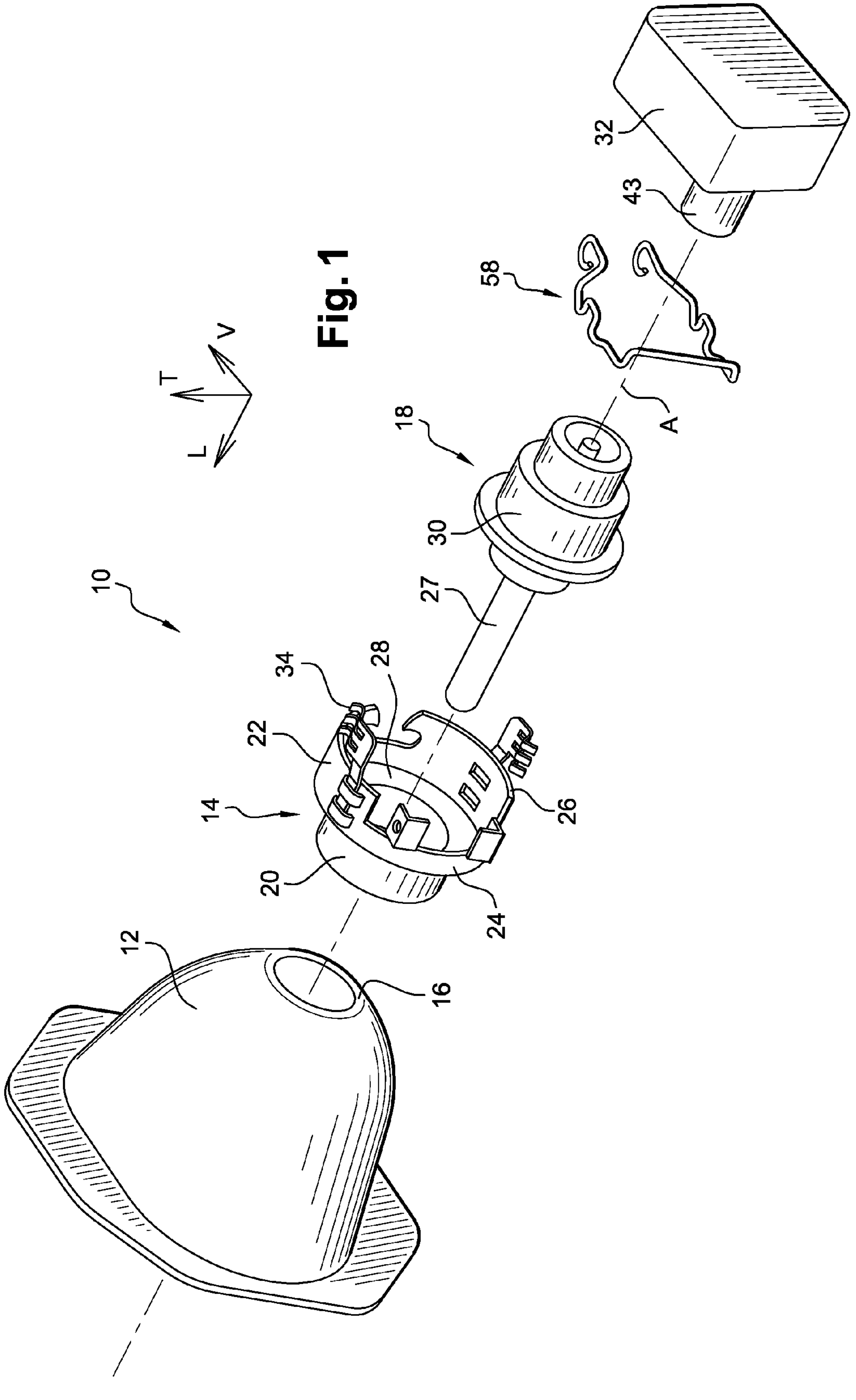
FIG. 1 is an exploded perspective view that depicts a motor vehicle headlight comprising a reflector and a lamp holder produced in accordance with the teachings of the invention, in which a lamp equipped with a high-voltage connector is mounted.

For the remainder of the description, longitudinal, vertical and transverse orientations indicated by the trihedron L, V, T, in FIG. 1 will be adopted. The longitudinal orientation is directed from rear to front in the direction indicated by the arrow "L" of the trihedron. Hereinafter, similar analogous or identical elements will be designated by the same reference numbers.

FIG. 1 depicts a motor vehicle headlight 10. The headlight 10 comprises a reflector 12 and a lamp holder 14.

The reflector 12 has here the shape of a dome open longitudinally towards the front. The reflector 12 comprises here a longitudinal optical axis "A". The rear end top of the reflector 12 comprises a orifice 16 for a lamp 18 to pass.

The lamp holder 14 comprises a body with a roughly cylindrical tubular shape with a longitudinal principal axis "A" and is delimited radially by a roughly cylindrical wall 24.

For the remainder of the description, the radial orientations will all be defined with respect to the principal axis "A" of the lamp holder 14. Thus a radial plane will be orthogonal to the principal axis "A". Tangential orientations that extend in a radial plane tangent to the cylindrical wall 24 of the lamp holder 14 are also defined.

A front end portion 20 of the lamp holder 14 is conformed so as to be able to be inserted longitudinally towards the front in the rear orifice 16 of the reflector 12, then fixed during an operation of mounting the lamp holder 14.

The wall 24 of the lamp holder 14 is then in electrical contact with the reflector 12.

When the lamp holder 14 is mounted in the reflector 12, a rear end portion 22 of the lamp holder 14 projects longitudinally towards the rear with respect to the reflector 12.

The cylindrical wall 24 of the rear end portion 22 of the lamp holder 14 has an external cylindrical face. The rear end portion 22 is delimited longitudinally towards the rear by a circular rear end 26.

The lamp 18 is here an arc lamp that is intended to be mounted in the lamp holder 14. The lamp 18 has a front cylindrical bulb 27 that is fixed in a rear cap 30 axisymmetric with respect to the principal axis "A". The rear cap 30 comprises a radial collar with a diameter greater than that of the bulb 27.

The rear end of the rear cap 30 has means of electrical connection to a high-voltage connector 32 so as to be supplied with electricity.

The high-voltage connector 32 comprises connection means complementary to those of the cap 30 which are arranged at the front of the body of the high-voltage connector 32.

In a known manner, for mounting the high-voltage connector 32 on the cap 30 of the lamp 18, the cap 30 of the lamp 18 has first bayonet mounting means that cooperate with second bayonet mounting means carried by the high-voltage connector 32. In the example depicted in FIG. 1, the cap 30 of the lamp 18 has radial lugs that cooperate with grooves in the shape of an "L" (not shown) carried by the connector 32.

The lamp holder 14 has an internal radial shoulder face 28 that separates the front end portion 20 from the rear end portion 22. The shoulder face 28 is sized so that the bulb 27 of the lamp 18 can pass longitudinally towards the front portion 20 through the lamp holder 14 but so that the collar of the cap 30 comes into abutment against the shoulder face 28.

The lamp holder 14 also comprises means of fixing the cap 30 of the lamp 18 in a mounted position, which will be described in more detail below.

When the lamp 18 is mounted in the lamp holder 14, the lamp 18 is inserted coaxially from rear to front inside the lamp holder 14, the bulb 27 being directed towards the front, until the cap 30 is in abutment against the shoulder face 28. The lamp 18 is then fixed to the lamp holder 14 by means of the spring 58. The cap 30 of the lamp 18 is thus housed inside the rear end portion 22 of the lamp holder 14, whilst the bulb 27 projects longitudinally towards the front with respect to the lamp holder 14 inside the reflector 12.

The high-voltage connector 32 is then mounted on the cap 30 of the lamp 18 after the lamp 18 has been mounted in the lamp holder 14.

During the operation of mounting the connector 32, the cap 30 is inserted axially in the front connection means of the high-voltage connector 32, and then the connector 32 is fixed to the cap 30 by pivoting about the principal axis "A", for example by pivoting a quarter of a turn in the clockwise direction.

In order to electrically connect the lamp holder 14 to the high-voltage connector 32, the lamp holder 14 is equipped with claws 34 that are arranged so as to be in contact with a portion 43 of the body of the high-voltage connector 32 referred to as the contact portion 43.

The claws 34 are more particularly in contact with an external surface portion 33 of the connector 32 and produced from an electrically conductive material and electrically connected to the vehicle earth.

According to the teachings of the invention, the claws 34 are carried by longitudinal fingers 36 and extend in a tangential direction with respect to the cylindrical wall 24 of the rear of the end portion 22 of the lamp holder 14.

The lamp holder 14 comprises here two fingers 36 that each carry three claws 34. In the example depicted in the figures, the fingers 36 are arranged at two diametrically opposed points on the lamp holder 14. According to the type of connector used, they can of course be disposed on the portion 22 in a different non-symmetrical configuration. This has the advantage of greater flexibility in the design of the lamp holder according to the invention.

Each finger 36 has a front end portion 38 that is fixed against the external cylindrical face of the wall 24 of the lamp holder 14. Each finger 36 also comprises a rear end portion 40 that extends longitudinally towards the rear with respect to the rear end 26 of the lamp holder 14, and which carries the claws 34.

The finger 36 and claws 34 are produced from an electrically conductive material such as copper.

Advantageously, the claws 34 and the finger 36 that carries them are produced in one piece.

Figure 2:
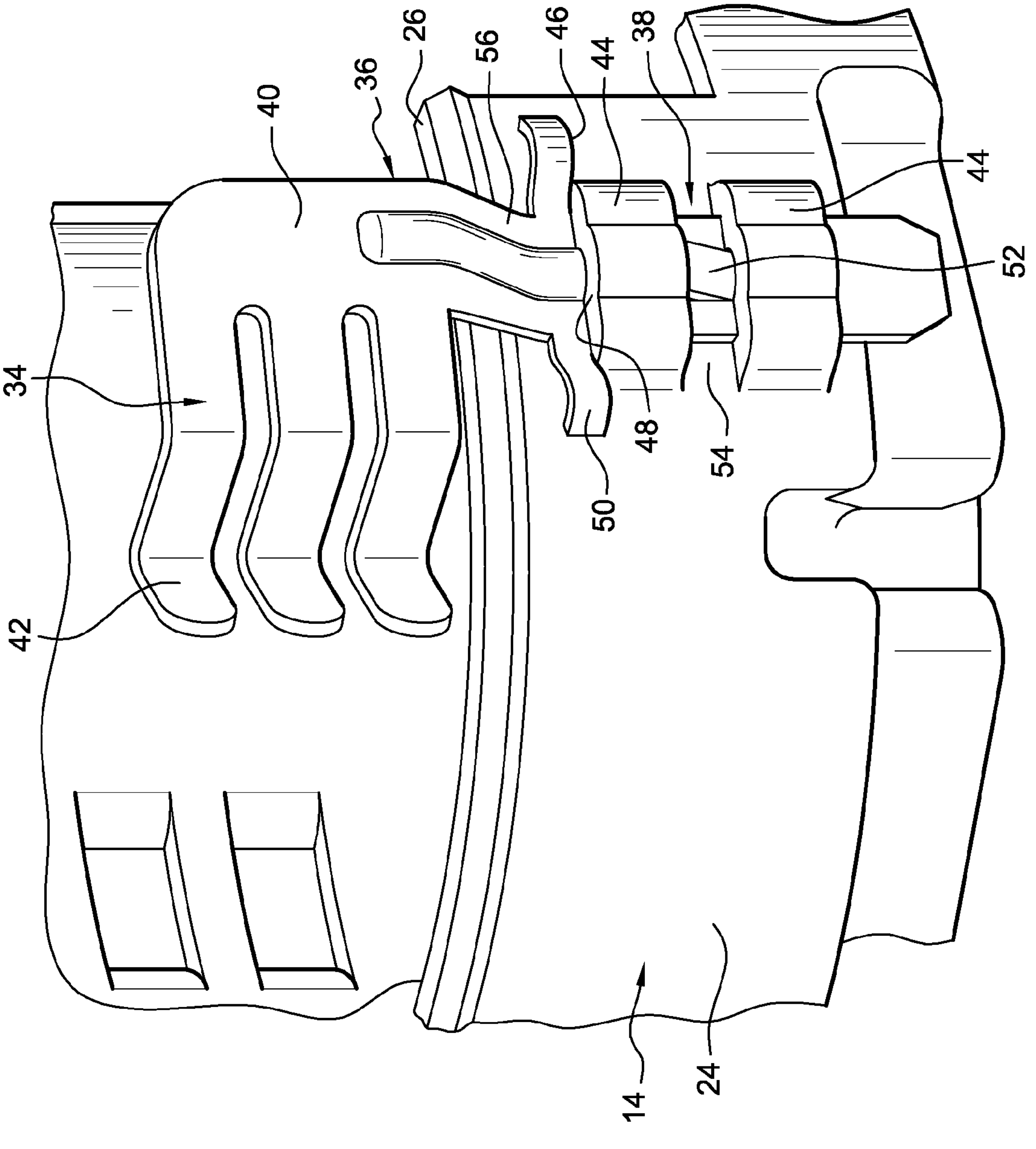
FIG. 2 is a detail view to a larger scale that depicts a finger of the lamp holder of FIG. 1 carrying claws.

The claws 34 extend here from the finger 36 in a tangential direction that is orientated in the direction of pivoting for the bayonet mounting of the high-voltage connector 32. The claws 34 carried by a finger 36 are arranged parallel to one another and longitudinally one behind the other so that the rear end portion 40 and the claws 34 form a comb, as depicted in FIG. 2.

Each claw 34 has a free end portion 42 curved so that the convex face of the claws 34 is directed towards the principal axis "A" of the lamp holder 14. These curved portions 42 are intended to be in electrical contact with the contact portion 43 of the mounted high-voltage connector 32.

The contact portion 43 of the external surface of the body of the connector that is opposite the claws 34 has a cylindrical shape so that the curved portion 42 of the claws 34 slides over the body of the connector 32 when it pivots.

The claws 34 are elastically deformable in flexion in a radial direction so that, when the connector pivots for its bayonet mounting or removal, the claws 34 are able to flex to facilitate pivoting. The curved portions 42 thus guide the claws 34 in flexion like a cam against a cam follower.

The elasticity of the claws 34 in particular makes it possible to reduce the friction of the claws 34 against the body of the connector 32.

In addition and non-limitingly, the contact portion 43 of the body of the connector 32 can also comprise angular location means in relief, for example protrusions, in which the curved portions 42 of the claws 34 can fit in the mounted position of the connector 32.

The front end portion 38 of the finger 36 is pressed against the external cylindrical face of the wall 24 of the lamp holder 14 so as to be in electrical contact with the wall 24 of the lamp holder 14.

The finger 36 is fixed to the cylindrical wall 24 of the rear end portion 22 of the lamp holder 14 by elastic fitting of the front end portion 38 of the finger 36 in a housing with complementary shapes carried by the lamp holder 14.

The housing is here formed by a first rear carrier 44 and a second front carrier 44 that are arranged longitudinally one behind the other on the external cylindrical face of the wall 24 of the lamp holder 14 so that the front end portion 38 of the finger 36 is mounted in a longitudinal sliding movement from rear to front between the external cylindrical face of the wall 24 of the lamp holder 14 and the carriers 44.

The carriers 44 are here produced by cropping and pressing of the wall 24 of the lamp holder 14.

The front end portion 38 of the finger 36 has a radial shoulder face 28 intended to be in contact with a facing rear end edge 48 of the rear carrier 44 in order to lock the forward sliding of the finger 36. The shoulder face 46 is here carried by two opposite lugs 50 that extend perpendicular to the finger 36.

The front end portion 38 of the finger 36 also has a lug 3252 that extends radially towards the outside so as to be received by elastic deformation in an associated aperture 54 carried by the lamp holder 14 in order to lock the rearward sliding of the finger 36. The aperture 54 is here delimited longitudinally towards the front and towards the rear by the two carriers 44.

The finger 36 is thus locked longitudinally in the mounted position by the shoulder face 46 and by the lug 52.

According to a variant of the invention that is not shown, the lug 52 can be produced in the external cylindrical face of the wall 24 of the lamp holder 14, and the lug 52 can then extend radially towards the inside of the lamp holder 14.

According to a variant, not shown, of the means of fixing the finger 36, the finger 36 is fixed to the wall 24 of the lamp holder 14 by means of a fixing clamp that is clamped or crimped around the external cylindrical face of the wall 24 of the rear end portion 22 of the lamp holder 14.

The cylindrical contact portion 43 (FIG. 1) of the body of the high-voltage connector 32 having a diameter greater than that of the rear end portion 22 of the lamp holder 14, the finger 36 comprises here an inclined intermediate portion 56 (FIG. 2) so that the rear end portion 40 of the finger 36 is offset radially towards the outside with respect to the front end portion 38 of the finger 36 so that the claws 34 of one finger 36 are sufficiently separated from the claws 34 of the other finger 36 to allow passage of the body of the high-voltage connector 32. The outward offset of the rear end portion 40 with respect to the front end portion 38 of the finger 36 will of course depend on the type of high-voltage connector used.

To increase the rigidity of the finger 36, the finger 36 comprises a longitudinal rib that extends from the rear front end portion 38 as far as the rear end of portion 40, running along the immediate portion 56. Thus only the claws are liable to deform during the operation of mounting the high-voltage connector 32 whilst the finger 36 are not deformed.

Figure 3:
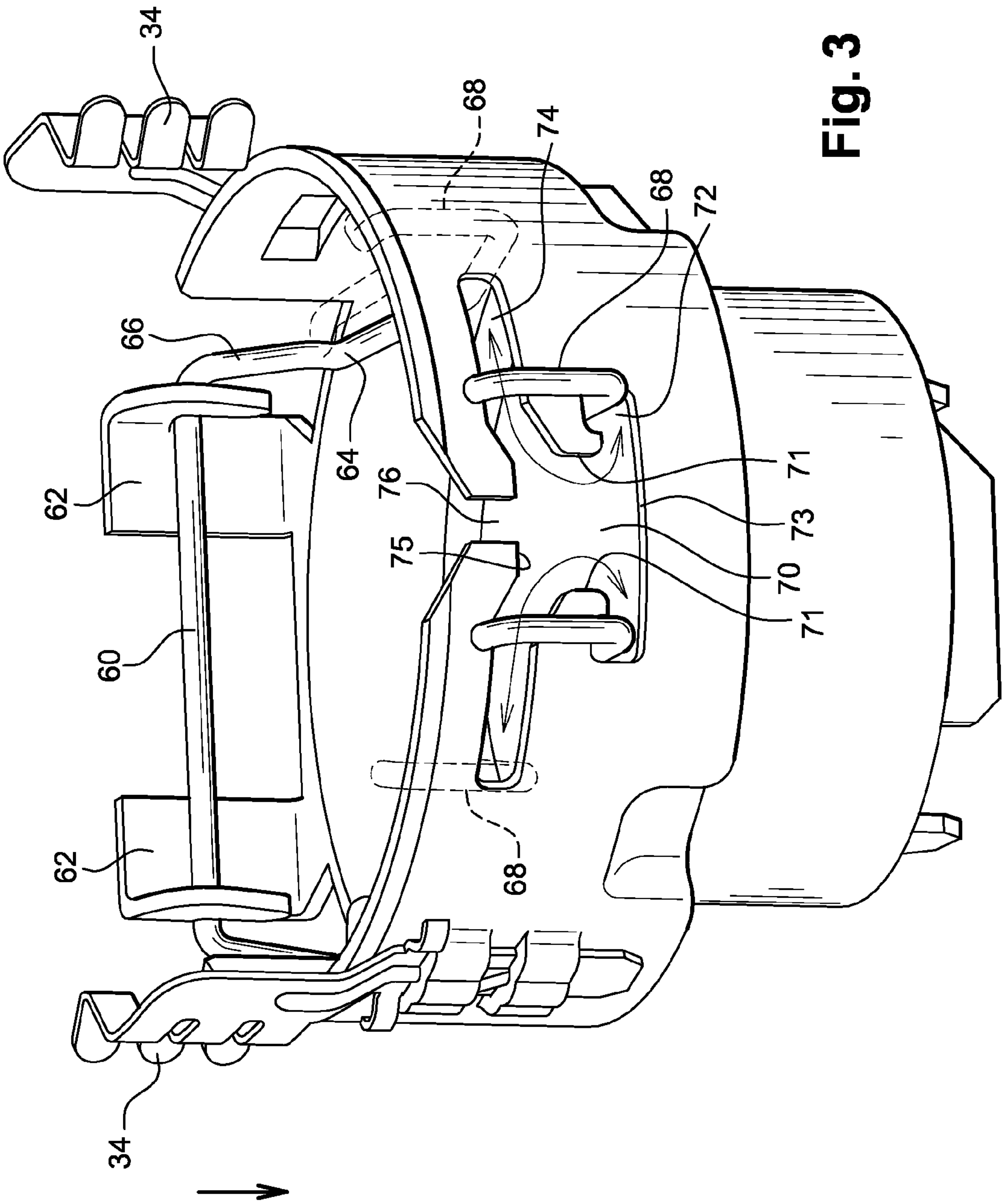
FIG. 3 is a view in perspective that depicts the lamp holder of FIG. 1 comprising two fingers equipped with claws and comprising a means of fixing the lamps.
Figure 4:
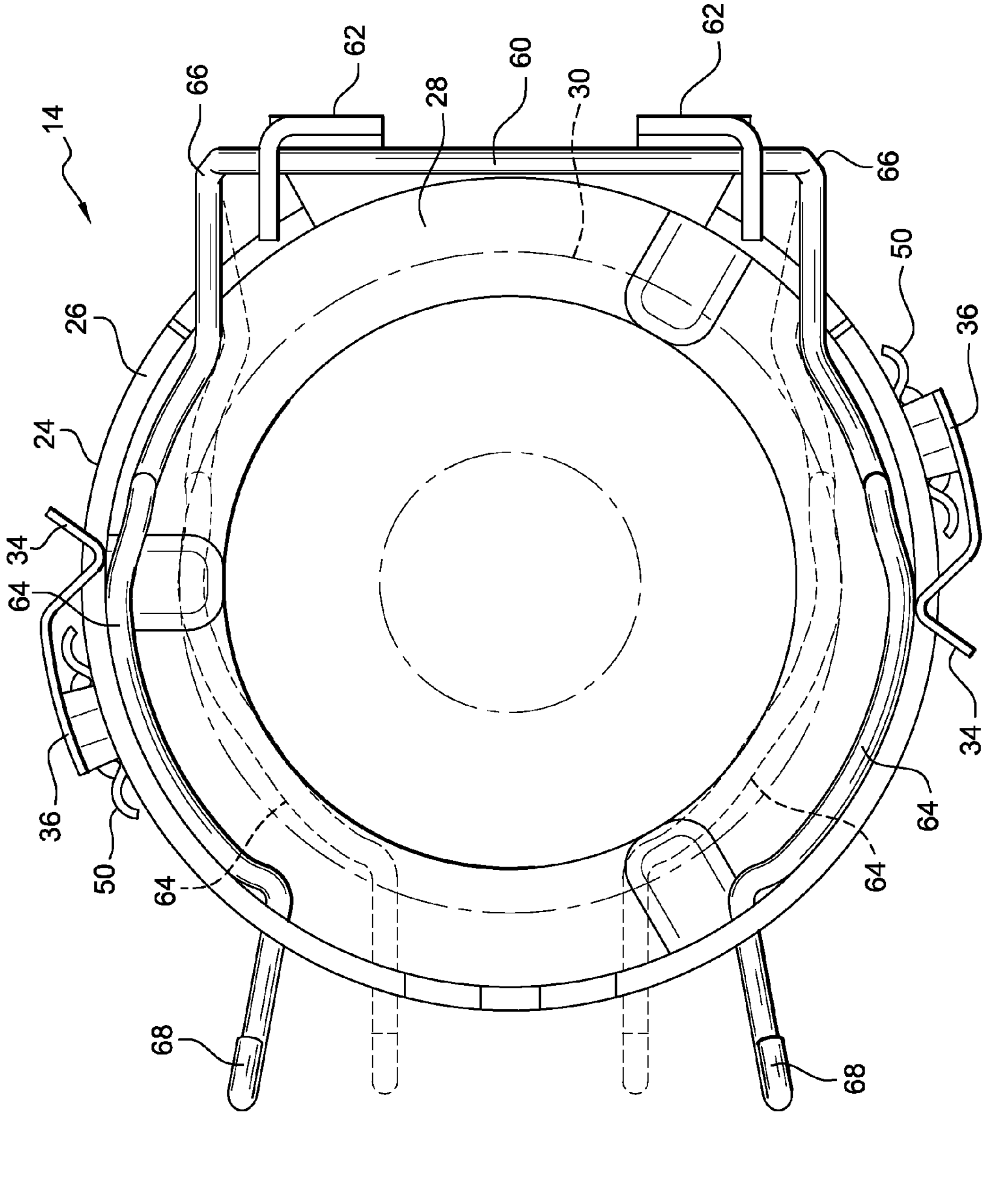
FIG. 4 is a plan view of the lamp holder in FIG. 3, the means of fixing the lamp being in the open position.

According to another aspect of the invention depicted in FIGS. 3 and 4, the lamp holder 14 also comprises means for fixing the lamp 18 to the lamp holder 14. More particularly, the lamp holder 14 has a spring 58 that has a transverse pivoting axis 60 that is received in a hinge 62 in the lamp holder 14 so that the pivot axis 60 extends substantially tangentially with respect to the cylindrical wall 24 of the lamp holder 14.

The spring 58 also comprises two arms 64 that extend symmetrically with respect to a mid-plane of the pivot axis 60 from the ends of the pivot axis 60 in a plane substantially radial with respect to the principal axis "A", passing through the internal circular space delimited radially by the cylindrical wall 24 of the lamp holder 14. Each arm thus has a first end 66 for connection with the pivot axis 60 and a second free end 68.

The arms 64 are produced in one piece with the pivot axis 60, preferably by folding a wire produced from a metal material having elastic properties.

Thus the end 66 of each arm 64 connecting with the pivot axis 60 is elastically deformable in flexion so that the arms 64 can be controlled between a closed position in which the free ends 68 are close to each other and an open position in which the free ends 68 are separated from each other and towards which the arms 64 are returned elastically.

For this purpose, the free ends 68 of the arms 64 are conformed so as to be able to be gripped between two fingers of an operator.

As depicted in broken lines in FIGS. 3 and 4, when the arms 64 of the spring 58 are in the closed position, the cap 30 of the lamp 18 is able to be locked in the stop position against the shoulder face 28 of the lamp holder 14 by the arms 64, which bear on the rear face of the collar of the cap 30.

As depicted in FIGS. 3 and 4, in their open position the arms are arranged laterally on each side of the cap 30 so as to allow the longitudinal sliding of the lamp 18 towards the rear with respect to the lamp holder 14.

Moreover, the cylindrical wall 24 of the rear end portion 22 of the lamp holder 14 has an opening 70 arranged so as to be diametrically opposed to the hinge 62. The opening 70 is for example obtained by cropping the wall 24. The opening 70 is intended to allow the passage of the free ends 68 of the arms 64 through the wall 24 of the lamp holder 14 towards the outside.

The opening 70 is delimited laterally by two lateral longitudinal walls 71 and longitudinally by a front edge and a rear edge 75.

Each lateral wall 71 comprises a first front notch 72 and a second rear notch 74 that are formed in the cylindrical wall 24 of the lamp holder 14 and that are intended to receive an associated arm. The front 72 or respectively rear 74 notch in a lateral wall 71 is arranged opposite the front 72 or respectively rear 74 notch in the opposite lateral wall 71.

The front notch 72 is less deep than the rear notch 74. The front notch 72 is intended to lock the arms 64 in their closed position whilst the second rear notch is intended to lock the arms in the open position.

For passage of the arms 64 from one notch to the other, the spring 58 pivots about its pivot axis 60 and thus the arms are mounted so as to be able to move between a closed front position for locking the lamp 18 in the mounted position and a closed rear position for removing the lamp 18.

In the open rear position, the pivoting of the arms about the pivot axis 60 is locked in both directions by the front and rear lips of the rear notch 74.

Likewise, in the closed front position, the pivoting of the arms about the pivot axis 60 is locked in both directions by the front and rear lips of the front notch 72.

For mounting the arms 64 in the opening 70, a longitudinal slot 76 is produced in the wall 24 between the rear end 26 of the lamp holder 14 and the rear edge 75 of the opening 70. The slot 76 is more particularly arranged at the center of the rear edge 75 of the opening 70.

The bottom mounting slot 76 has a width less than the width of the rear edge 75 of the opening 70, so that, when the arms 64 pass from their closed front position to their open rear position, the pivoting of the arms 64 about the pivot axis 60 towards the rear is limited by the rear edge 75 arranged between the slot 76 and the notch 74.

In addition, the slot has a width such that only one arm at a time can pass through the slot 76.

Thus the rear lip of the rear notches 74 and the rear edge 75 of the opening 70 form stops that are able to limit the rearward pivoting of the arms 64 with respect to the pivot axis 60 in order to prevent the arms encumbering the space situated at the rear of the lamp holder 14 when the spring 58 is in its open position, and thus preventing the arms 64 constituting an interference in this open position.

In addition, the free ends 68 of the arms 64 being held in determined positions by the front 72 and rear 74 notches, an operator can perform the mounting and removal operation with a single hand without necessarily seeing the lamp holder 14.

Advantageously, the rear end 26 of the lamp holder 14 is beveled on each side of the slot 76 so as to guide the arms 64 towards the slot 76 when the spring 58 is being mounted on the lamp holder 14.

When the lamp 18 is mounted in the lamp holder 14, the spring 58 (FIG. 1) is in the separated rear position (FIG. 4). The lamp 18 is then inserted longitudinally from rear to front inside the lamp holder 14 (FIG. 4), with the bulb 27 towards the front.

Then, when the cap 30 is in abutment against the shoulder face 28, the spring 58 is controlled towards its front closed position so that the lamp 18 is fixed in +the lamp holder 14. The free ends 68 and the arms 64 are gripped by an operator so that each of the arms 64 emerges from the associated rear notch 74.

The arms 64 are then free to pivot about the pivot axis 60 towards the front. Their pivoting towards the rear is in fact limited by the rear edge 75 of the opening 70. When the arms 64 are facing the front notches 72, the operator releases his gripping force and the arms separate elastically towards their closed position, entering the associated front notch 72.

Next the high-voltage connector 32 is mounted on the lamp 18. Initially the connector 32 is positioned against the cap 30 of the lamp 18 by longitudinal sliding of the connector 32 from rear to front with respect to the cap 30. The contact portion 43 of the body of the connector 32 is thus in contact with the claws 34.

Secondly, the connector 32 is pivoted about the principal axis “A” with respect to the cap 30. The contact portion 43 of the body of the connector 32 slides against the curved portion 42 of the claws 34, if necessary lifting them radially automatically when the external surface of the body of the connector 32 has reliefs or imperfections.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lamp holder for a headlight, in particular for a motor vehicle, which is intended to carry a lamp, a cap of which comprises means for the bayonet mounting of a high-voltage connector, the lamp holder comprising:

a body delimited radially by a roughly cylindrical tubular wall with a longitudinal principal axis, produced from an electrically conductive material;

means of fixing the cap of the lamp coaxially in the lamp holder so that the body of the high-voltage connector, when it is mounted on the lamp, extends longitudinally towards the rear from a rear end edge of the wall of the lamp holder; and at least one claw electrically connected to the wall of the lamp holder and intended to be in contact with the body of the high-voltage connector, when it is mounted, so as to discharge the lamp holder, which is electrically charged by an electromagnetic field emitted by the lamp;

wherein said at least one claw extends in a tangential direction with respect to the wall of the lamp holder and perpendicular with respect to the longitudinal principal axis;

wherein said at least one claw is carried by a rear end portion of a longitudinal finger that is fixed to an external face of said wall of the lamp holder and extends projecting with respect to the rear end edge of said wall of the lamp holder;

wherein said at least one claw extends from said longitudinal finger in a tangential direction with respect to said wall of the lamp holder in the direction of the pivoting movement for the bayonet mounting of the high-voltage connector;

wherein said lamp holder comprises a plurality of claws that are carried by at least one finger;

wherein said plurality of claws are arranged on the rear end portion of the finger, longitudinally one behind the other and parallel to each other so as to form a comb.

2. The lamp holder according to claim 1, wherein said plurality of claws are elastically deformable in flexion in a radial direction with respect to the principal axis of the lamp holder.

3. The lamp holder according to claim 1, wherein said longitudinal finger is fixed to the wall of the lamp holder by means of a fixing flange.

4. The lamp holder according to claim 1, wherein said longitudinal finger is fixed to the wall of the lamp holder by an elastic snapping of the front end portion of the finger in a housing of complementary shape.

5. The lamp holder according to claim 4, wherein the housing is formed by at least one carrier arranged on the external cylindrical face of the wall of the lamp holder so that the front end portion of said longitudinal finger is mounted in a longitudinal sliding movement from rear to front between the external cylindrical face of the lamp holder and the carrier.

6. The lamp holder according to claim 5, wherein the front end portion of said longitudinal finger comprises a lug that extends radially so as to be received by elastic deformation in an associated aperture carried by the wall of the lamp holder in order to lock the sliding of said longitudinal finger towards the rear.

7. The lamp holder according to claim 6, wherein the aperture is carried by the carrier.

8. The lamp holder according to claim 5, wherein the front end portion of said longitudinal finger has a radial shoulder face intended to be in contact with an opposite face of the carrier in order to lock the sliding of the finger towards the front.

9. The lamp holder according to claim 1, wherein said lamp is intended to be introduced from rear to front coaxially with the wall of the lamp holder until the cap is in abutment against a radial shoulder face of the lamp holder, and of the type in which the means of fixing the cap of the lamp comprises two parallel arms that extend in a radial plane inside the lamp holder and that are mounted so as to pivot about a common transverse axis arranged substantially tangentially to the wall of the lamp holder, between a front position and a rear position, the arms being mounted so as to be articulated with respect to the pivot axis between a first closed position in which the free ends of the arms are close to each other and a second open position in which the free ends of the arms are separated from each other, towards which they are elastically returned so that:

in a closed front locking position, the arms lock the cap of the lamp against the shoulder face of the lamp holder;

and so that, in a rear open release position, the cap is able to slide longitudinally towards the rear, the rotation of the arms about the pivot axis towards the rear being limited by a stop, wherein the stop is produced in one piece with the wall of the lamp holder.

10. The lamp holder according to claim 9, wherein the stop is produced by the rear lip of an opening produced in the cylindrical wall of the lamp holder.

11. The lamp holder according to claim 10, wherein the opening is produced in a vicinity of the free end of the arms.

12. The lamp holder according to claim 9, wherein the common pivot axis is produced in one piece with the arms.

13. A headlight assembly for a motor vehicle, which is intended to carry a lamp, said headlight assembly having a lamp holder comprising:

a body comprising a generally cylindrical wall with a longitudinal principal axis, said generally cylindrical wall produced form an electrically conductive material;

at least one lock for fixing a cap of a lamp coaxially in the lamp holder;

at least one claw electrically connected to said generally cylindrical wall and intended to be in contact with a body of a high voltage connector when it is mounted to the lamp holder so as to discharge said lamp holder, which is electrically charged by an electromagnetic field emitted by the lamp;

wherein said at least one claw extends in a tangential direction wit respect to said generally cylindrical wall and perpendicular with respect to said longitudinal principal axis;

wherein the said at least one claw is carried by a rear end portion of a longitudinal finger that is fixed to an external face of said wall of the lamp holder and extends projecting with respect to the rear end edge of said wall of the lamp holder;

wherein the said at least one claw extends from the said longitudinal finger in a tangential direction with respect to said wall of the lamp holder in the direction of the pivoting movement for the bayonet mounting of the high-voltage connector; and wherein said lamp holder comprises a plurality of claws that are carried by at least one finger.

14. The headlight assembly of claim 13 wherein said at least one claw is carried by a rear end portion of a longitudinal finger that is fixed to an external face of said generally cylindrical wall of the lamp holder.

15. The headlight assembly accordingly to claim 14 wherein said at least one claw extends from said longitudinal finger in a tangential direction with respect to said generally cylindrical wall of the lamp holder.

16. The headlight assembly according to claim 15 wherein said lamp holder comprises a plurality of claws.

* * * * *